United States Patent Office 3,541,000
Patented Nov. 17, 1970

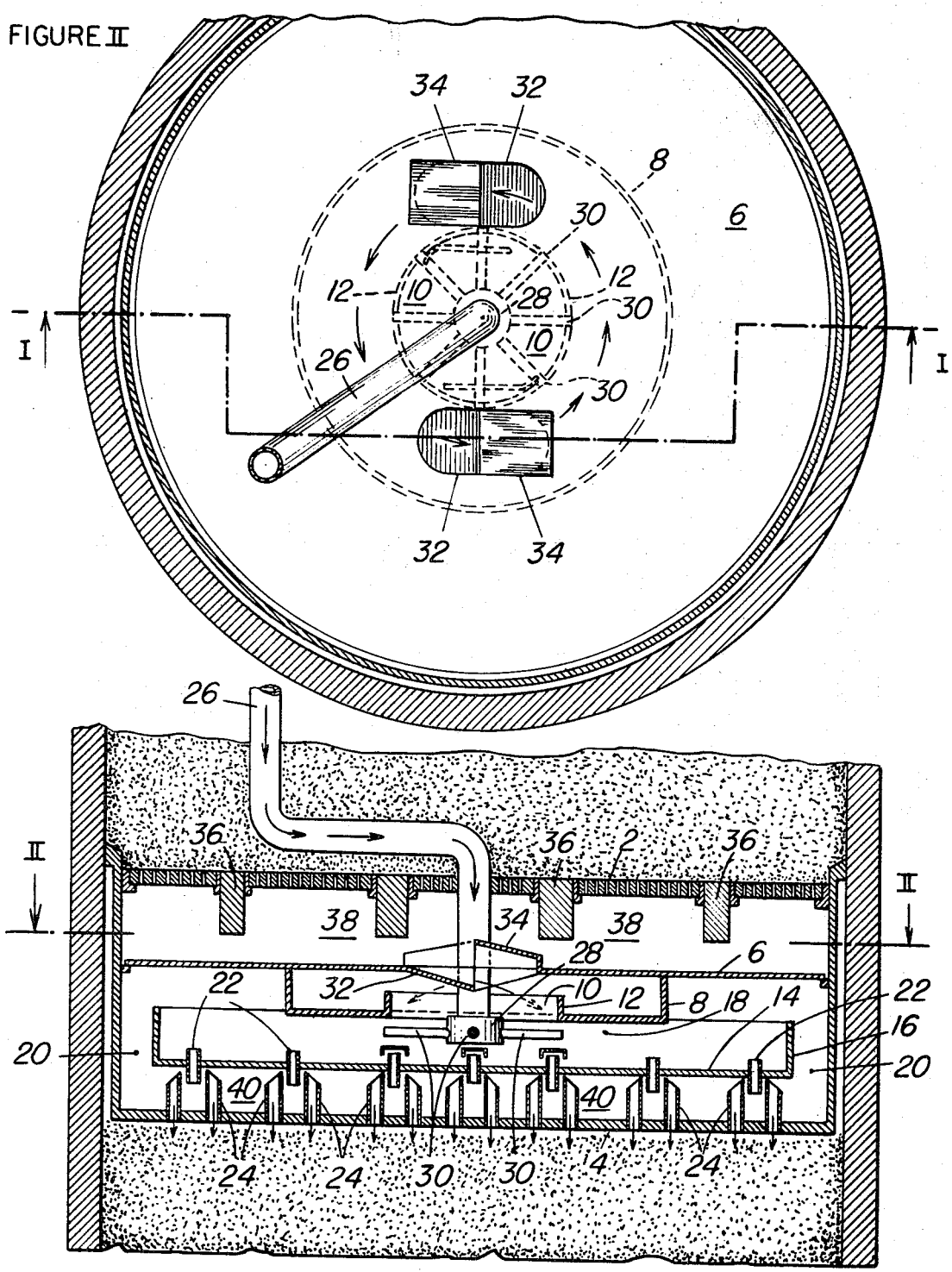

---

3,541,000
METHOD AND MEANS FOR TREATING MIXED PHASE VAPOR AND LIQUID REACTANTS UNDER EXOTHERMIC REACTION CONDITIONS AND TEMPERATURE CONTROL
Francis V. Hanson and Paul W. Snyder, Jr., Pitman, N.J., assignors to Mobil Oil Corporation, a corporation of New York
Filed Aug. 27, 1968, Ser. No. 755,638
Int. Cl. C10g $13/02$
U.S. Cl. 208—108                    6 Claims

ABSTRACT OF THE DISCLOSURE

A quench zone system or apparatus utilizable in a multiple catalyst bed exothermic reaction system is described which will provide for controlling more uniformly lateral and longitudinal temperature gradients within well defined limits by more effectively adjusting the temperature of each of collected vapor and liquid phases in suitable transverse mixing zones before re-contact with catalytic materials. Quenching of gasiform material is accomplished with hydrogen rich quench gas in a highly turbulent transverse mixing zone before redistribution over the surface of the catalyst bed to be contacted and quenching of the liquid phase after adjustment to a uniform temperature is particularly effected on the surface and upper portion of the catalyst bed by the quenched gasiform material above identified.

BACKGROUND OF THE INVENTION

The chemical treatment of hydrocarbons and organic compounds as fluid reactants in vapor phase, liquid phase or mixed vapor liquid phase condition with catalytic agents such as finely divided solid- catalytic contact material has prompted continuous technological developments which would devise means or apparatus and a method of utilization for improving the contact of reactant material with catalytic agents. In many of these contacting operations or systems, the fluid reactants are maintained in a gasiform condition and the contact operation may be involved with a combination of endothermic and exothermic reaction temperature conditions. Thus, operations of this sort markedly influence the arrangement of apparatus and system employed for promoting desired reactions. In a mixed phase exothermic reaction system involving the contact of hydrocarbon material with catalytic agents under elevated pressure conditions, the problems associated with controlling the operation are considerably amplified when a relatively close temperature control is essential under conditions which also provide minimum pressure drop in the system. Furthermore, when effecting contact in a mixed phase system involving liquid vapor phase materials in a plurality of catalyst beds operated under exothermic reaction conditions, the mixed phase fluid material discharged from a bed of catalyst and prior to contact with another bed of catalyst requires temperature adjustment as one method of effecting temperature control in the system. Thus it is necessary to effect a collection of the mixed phase fluid materials and redistribute the temperature adjusted phases before further contact in another catalyst bed.

It has been found, however, that the prior art arrangements of apparatus have not been completely suitable or satisfactory where it is esesntial to provide a more uniform temperature control than heretofore available while maintaining pressure drop in the system at a desired low minimum level. Thus an object of the present invention is to improve upon the apparatus and system for adjusting the temperature of mixed phase reactant materials passed through a plurality of exothermic catalytic beds.

SUMMARY OF THE INVENTION

This invention relates to the method and means employed for effecting control of exothermic reactions and the fluid reactants exposed to such reactions in the presence of catalytic agents. More particularly, the invention is concerned with the apparatus and system for assuring an effective control of temperature gradients in both lateral and longitudinal directions encountered by vapor and liquid materials so as to assure the confinement of the temperatures encountered within a desired predetermined range. Thus the invention is particularly concerned with the method and means for collecting, mixing, temperature adjusting and effecting the redistribution of each component of the liquid-vapor phase of a mixed-phase contact system so that undesired low pressure drop will not be exceeded and temperature gradients encountered will be effectively maintained within desired narrow limits.

In the method of this invention, fluid materials comprising a mixture of liquid and vaporous materials such as hydrocarbon reactant materials and reaction products thereof and at a desired elevated reaction temperature are caused to move sequentially through a plurality of catalyst beds of the same or different depth or volumetric capacity so as to achieve a desired catalytic change in at least the reactant materials under selected exothermic temperature and pressure operating conditoins. In the operation herein particularly identified, selected operating temperature conditions through lateral and longitudinal configuration of a multiple catalyst bed reaction zone are required and controlled by distribution of temperature adjusted materials in vapor liquid phase substantially uniformly across the surface of a bed of catalyst and the extent of exothermic temperature increase in any direction through a bed of catalyst is controlled in combination therewith with one or more variables comprising catalyst bed thickness, catalyst activity, space velocity, temperature gradient tolerated and indirect and direct cooling of exothermic reactions taking place.

In a more specific aspect, the present invention is concerned with a method and means employed for adjusting the temperature of vaporous and liquid materials withdrawn from a bed of catalyst encountering exothermic reaction conditions and prior to further contact thereof in another bed of catalyst in the sequence of catalyst beds. Thus the present invention is particularly concerned with collecting all of the mixed phase components comnrising liquid and vaporous material discharged from a bed of catalyst so that the temperature of each can be adjusted to a relatively uniform temperature, as distinguished from an average temperature, before redistribution over the next succeeding bed of catalyst. It is important in this combination, however, that the vaporous portion of the fluid material be collected and temperature adjusted separately and downwardly a desired amount by contact with a suitable quench fluid such as hydrogen rich gas and prior to redistribution of the vaporous portion of the reactants over the surface of the next succeeding catalyst bed. Thus while it may be desirable to reduce the temperature of the liquid portion of the fluid material, it has been found that this can be accomplished and with a minimum of pressure drop in the apparatus after collecting to adjust the temperature thereof by effecting cooling on the upper surface or portion of the catalyst bed. This adjustment is effectively accomplished provided the liquid material is at a uniform temperature before redistribution over the surface of the catalyst bed to be contacted. The cooling of the liquid portion is accomplished by the temperature reduced vaporous material with a minimum of pressure drop. To accomplish the more effective temperature control of the mixed phase fluid reactants employed in an exothermic catalytic process, apparatus means are provided between catalyst beds for collecting the liquid and vaporous materials discharged from a catalyst bed. Thereafter, each is turbulently mixed and agitated in a transverse mixing chamber of minimum pressure drop and for a time sufficient to obtain the uniform temperature adjustment desired in the collected materials. Thereafter, the temperature adjusted materials are then redistributed over the inlet surface of the catalyst bed to be contacted. In this sequence to obtain temperature control, it is important, however, that at least the vaporous portion of the fluid material be cooled uniformly to impart a desired uniform temperature reduction therein. The collected vaporous material thus reduced to a desired lower temperature is thereafter redistributed over the surface of the catalyst bed to be contacted. It is particularly important in selecting the arrangement of apparatus and system for accomplishing the above that the apparatus provide a minimum of pressure drop which is less than about 5 p.s.i. per quench zone and occupy a minimum of space.

The method and means of the present invention departs from the prior art of U.S. Pat. 3,353,924, issued Nov. 21, 1967 and U.S. Pat. 3,378,349, issued Apr. 16, 1968 particularly in the method of operation and apparatus relied upon for collecting and effecting the temperature adjustment on the mixed phase liquid and vaporous material discharged from a catalyst bed. Thus within the available limited space between catalyst beds of a high pressure reaction system, provisions are made in a quench zone for collecting, mixing, quenching and redistribution of temperature adjusted vapors and liquid materials so as to effectively limit lateral and longitudinal temperature gradients encountered within desired limits.

The objective function of the quench zone in hydrocracking reactors is to limit the reactor temperatures as the exothermic reactions of hydrocracking proceed. In order to prevent temperatures encountered from exceeding design limitations, a cooling fluid, usually hydrogen rich recycle gas, is injected into a quench zone region positioned between catalyst beds for effecting the quenching of reactant materials. The flow and heat transfer requirements of a typical quench zone may be illustrated as follows. Assuming that about 48,000 pounds per hour of process gas and about 396,000 pounds per hour of process liquid at an average temperature of about 760° F. are disengaged from a catalyst bed in a suitable plenum or collecting chamber and it is desired to cool these two streams to a temperature of about 710° F. before they enter the next bed of catalyst; this temperature reduction requires the addition of about 34,000 pounds per hour of recycle quench gas at a temperature of about 150° F. It is not enough that these two streams of fluid materials enter the next bed at an average temperature of 710° F. but it is imperative that each stream must be at a uniform temperature throughout and at this specified reduced temperature. This is particularly true since there has been found that any temperature non-uniformity in either stream will be magnified several-fold as the fluids pass through each succeeding exothermic catalyst bed because of the exponential effect of temperature on the exothermic hydrocracking reaction rate. It also is to be observed that temperature non-uniformity may arise from lateral temperature differences produced in a catalyst bed above a quench zone and non-uniformity or non-distribution of reactant materials or of the cold quench gas throughout the hot process fluid materials in the quench zone. Furthermore, uniform distribution of the quench gas alone will not by itself eliminate a lateral temperature maldistribution unless properly handled. The total heat to be transferred from the reactant streams of vapor and liquid in order to decrease the temperature thereof from 760° F. to about 710° F. as suggested above is of the order of about 32,000,000 B.t.u. per hour. In this example since the liquid stream is almost ten times the process vapor stream in weight, about 85 percent of the heat is retained in the liquid stream and only about 15 percent is retained in the process vapor stream. Thus it becomes immediately clear that a good uniform distribution of quench gas within the process vapors is an important objective and it is also desirable to have an intimate contact between cooled vapors and the liquid materials flowing in the system. If a maldistribution exists in the temperature of reactant fluids entering a quench zone from a catalyst bed above, uniform distribution of the quench gas alone will not correct this temperature maldistribution. This type of maldistribution can result from poor quenching in an upper zone or from channeling of the reactant material due to catalyst loading and settling in a catalyst bed. Therefore it is absolutely essential that suitable collecting and mixing of the process liquid and vapors be provided so as to achieve adjustment in temperature as required to provide a uniform temperature within each stream and thus correct any maldistribution in temperature as might be encountered. Adequate liquid phase mixing is also considered to be a very critical factor in at least the initial stages of a catalytic cracking operation since about 85 percent of the reaction heat is found to reside in the process liquid stream. Furthermore, for the reasons herein discussed, adequate mixing of the vaporous material and subsequent quenching thereof to a uniform temperature is desirable so that the cooled vaporous materials upon redistribution can be relied upon to provide a relatively uniform quench to the liquid during initial contact in the next catalyst bed.

It has been found in order to obtain the uniformity of temperature desired that the collected liquid and vaporous material must be violently agitated in relatively symmetrical mixing zones which are somewhat separate zones and transversely functional of the reaction zone. The quench gas is introduced under relatively turbulent mixing conditions in at least the vapor mixing zone and extending radially from the inlet thereto whereby a uniformity in temperature reduction of the vapors is achieved in a symmetrical zone before passage thereof to a vapor distribution zone positioned adjacent to the surface of the catalyst bed next to be contacted.

In arriving at the method and apparatus or system of the present invention, a number of quench zone variations were made and tested with a view to identifying the arrangement which optimized with a minimum of pressure drop therethrough three basic criteria comprising (1) distribution of quench gas in the process vapors, (2) efficient transverse liquid mixing for obtaining temperature uniformity before redistribution on the surface of the next catalyst bed and (3) providing efficient transverse vapor mixing to obtain temperature uniformity of vapors before redistribution over the next catalyst bed.

The number of variations examined and investigated lead to the arrangement and combination of apparatus elements herein described. The specific apparatus or arrangement described in the drawing is referred to as a spider-vortex quenching arrangement. The object of the spider-vortex arrangement shown in the drawing is to impart a turbulence to the vapor and liquid coming in contact therewith so that the collected liquid material will assume a turbulent action or motion in a transverse quench pan provided with a center discharge provided with a weir over which turbulent liquid must flow. The pan effectively changes the direction of flow of the liquid discharged from the catalyst bed so as to collect it and violently agitate it in a vertical to horizontal flow pattern. The bottom of the quench pan with the center opening confines the flow of the collected liquid and vapors as well as through a confined or restricted opening of limited pressure drop. Beneath the opening, a quench gas distributor spider is provided in the initial portion of the annulus forming the vapor transverse mixing zone herein referred to as a radial mixing zone of symmetrical dimensions. The quench gas distributor distributes the quench gas in the collected and redispersed vapors radially therefrom in a highly turbulent mixing condition through the symmetrical confined transverse annular zone lying between the quench pan and the top of the downcomer tray. The jets of quench gas from the distributor educt the collected and redispersed process gas or vapor of a relatively uniform temperature into the symmetrical transverse mixing zone wherein a further uniform quenching of the vapors is achieved before distribution over the surface of the catalyst bed to be contacted therebelow.

The construction of one or more openings or spillways in the quench tray which are used to pass the collected liquid and vapor to the quench pan therebelow is designed to impart circular motion to the liquid and vapor material of considerable magnitude without imposing an undesired pressure drop or necessitating a power requirement on the system to achieve the desired movement and agitation of these reactant materials. In order to assure turbulence and good mixing in a circular motion, a pressure drop of up to two pounds at the bottom of the quench pan is found adequate. The hooded spillways and the height of the weir about the central opening is so arranged to occupy a minimum of reactor space between catalyst beds without exceeding the low pressure drop desired in the system. For example, in a reactor arrangement employing 5 catalyst beds and 4 quench zones in between, it is expected to limit the total pressure drop across the 4 quench zones so as not to exceed about 20 p.s.i. This 20 p.s.i. increased pressure loss is utilized with the quench gas nozzle in order to provide for and assure good distribution of the quench gas ejected from the spider and into the annulus of the transverse mixing zone.

FIG. I shows diagrammatically in elevation the arrangement of apparatus for forming a quench zone intermediate fixed beds of catalyst.

FIG. II shows diagrammatically a top sectional view of the quench zone as viewed from above the quench tray so as to show the position of the spillways for passing collected vapor liquid materials onto the annular quench pan.

DESCRIPTION OF THE DRAWINGS

Referring now to FIG. I, by way of example, there is shown diagrammatically in elevation an arrangement of apparatus forming one embodiment of the quench zone of the present invention. The quench zone or region is essentially that portion of the reactor vessel lying between two beds of catalyst separated by an upper support grid 2 and a lower distributor tray 4. A U-shaped baffle member in cross section comprising the distributor tray in at least the bottom horizontal portion thereof is hung from the reactor walls as shown to form a quench chamber and support means for the remaining portion of the apparatus employed in the chamber and forming the quench zone. The U-shaped baffle acts to seal one bed of catalyst from the other catalyst bed except in the portion thereof forming the distributor tray 4. The quench zone or region lying between support grid 2 and the U-shaped baffle member is further separated in an intermediate region thereof by a horizontal tray or baffle member 6 relatively non-pervious except as specifically described hereinafter. Coaxially positioned and hanging from the bottom of quench tray 6 is an annular pan 8 containing a central opening 10 and provided with a weir 12 about the central opening periphery. A horizontal shallow pan 14 provided with a lip at its periphery to form an upwardly extending weir 16 is positioned beneath and spaced apart from annular pan 8 to form an annular transverse mixing zone or chamber 18 which is radially symmetrical. Pan 14 is of a larger diameter than annular pan 8 and extended substantially to the walls of the chamber formed by the U-shaped baffle member 4 to provide an annular space 20 through which primarily vaporous material may flow. Pan 14 is perforated in at least its bottom surface by a plurality of elongated open end downcomers 22 extending above and below the pan bottom surface a considerable distance to assure flow of vapor and liquid materials as described herein. The distributor tray 4 is provided with a plurality of elongated open end pipes or downcomers 24 which extend above the horizontal surface of tray 4 and terminate adjacent the bottom surface of pan 14. The height of downcomers 22 and 24 above their respective plates is sufficient to maintain a desired level of liquid on each pan before overflow into each downcomer. Downcomers 22 may be serrated on the upper edge in a manner conventional in the art and, if placed under the opening 10, they may be provided with a bubble cap or other device to control the flow of liquid and/or vapor therethrough. Downcomers 24 are shown cut on a bias at the upper end so that liquid collected on tray 4 will overflow thereinto along with vapors and be distributed over the surface of the catalyst bed therebelow. Other arrangements may be employed on the upper end of downcomers 24 known in the art which will function to distribute liquid and vapor for passage downwardly therethrough. A pipe 26 provided for supplying a quench fluid to the quench zone coaxially extends downwardly through baffle 6 and opening 10 to a distributor chamber 28 forming the hub of a spider distributor for the quench fluid. A plurality of open ended pipes 30 extend horizontally outwardly from the hub a sufficient distance to terminate just beyond the periphery of the center opening 10.

As mentioned above, the quench tray 6 is provided with openings in the form of a capped chute arranged to pass fluid material collected on tray 6 onto the annular pan 8 and substantially tangentially thereto so as to provide violent agitation to the fluid material passing therethrough. In FIGS. I and II, there is shown at least two of the capped chutes provided for passing fluid material as above described. Thus the portion of the structure identified by numerals 32 and 34 respectively is intended to identify 32 as the bottom of the chute extending downwardly through tray 6 and cross-sectional member 34 as the capped portion of the chute and provided to assist with forcing fluids downwardly through the confined chute provided in tray 6. The chute is provided with a vertical baffle adjacent the weir to prevent fluids from passing over the weir rather than move around the annular mixing zone. It is to be understood that a plurality of these chutes may be provided in tray 6 as shown by FIG. II and there may be 2, 3, 4 or more of these chutes as required.

Referring now to FIG. II, there is shown a top cross-sectional view of the quench apparatus as viewed from above tray 6. In this view the spider for introducing quench fluid is shown coaxially positioned within opening 10 and provided with a plurality of quench fluid discharge pipes 30 extending radially from the distributor chamber 28. Pipe 26 is provided to supply quench fluid to the spider distributor chamber 28. Two capped chutes are also shown opposite to one another with surface 32 corresponding to the depressed portion of the chute extending downwardly through pan 6 and surface 34 corresponding to the capped portion of the chute and relied upon to assist with obtaining the desired directional flow of fluids through the chute and into annular quench pan 8.

In the arrangement of apparatus above described, fluid materials, essentially mixed vapor and liquid phase materials and at an elevated temperature caused by exothermic reaction temperature conditions in a bed of catalyst above, move downwardly through the porous grid 2 into a plenum or collecting chamber 38. Grid 2 is supported by transverse beams 36 and the reactor walls as shown. In collecting chamber 38, the vapor and liquid materials are caused to move essentially in a random motion thereby effecting some temperature adjustment in the liquid before passing downwardly through the chutes identified by numerals 32 onto the surface of an annular pan 8 provided therebelow. This downward flow of vapor and liquid through the chute and tengential introduction to the annular pan causes a violent turbulent mixing of the vapor and liquid phases before passing over weir 12 into the central opening 10. The turbulently flowing fluid phases are caused to pass through a spider assembly provided for introducing cold quench fluid such as hydrogen rich gas to the system. The liquid phase having thus been turbulently agitated and adjusted to a relatively uniform temperature is distributed on shallow pan 14 provided with a weir 16 at its periphery. The liquid phase is distributed by pan 14 provided with downcomer passageways 22 onto a lower distributor tray 4. As discussed hereinbefore, a desired level of liquid is carried on each of the distributor trays 14 and 4 by virtue of the downcomers provided for distributing liquid therefrom. The vaporous phase materials, on the other hand, upon passing through the opening 10 are picked up by radially dispersed cold quench gas discharged from the ends of pipes 30 and is turbulently agitated under quenching temperature conditions in a symmetrical annular chamber 18 which extends to the wall of the chamber as shown in the drawing. The vapors thus quenched and of uniform temperature then pass through annular space 20 and are caused to be distributed in the upper portion of zone 40 which is the chamber lying between horizontal pan 14 and distributor tray 4. A minor part of the quenched gas may pass from annular chamber 18 to zone 40 through the downcomers 22. In chamber 40 the vaporous material along with liquid phase material is caused to move downwardly through a plurality of downcomers 24 for distribution on the surface of a bed of catalyst lying therebelow.

In the arrangement above described, it is important to retain sufficient liquid on the surfaces of the various trays so as to facilitate the mixing thereof and maintain a relatively uniform temperature throughout the liquid phase maintained on each tray. The adjustment of the temperature of the vaporous phase is provided by the turbulent agitation developed by the apparatus provided and the further quenching thereof substantially radially in a symmetrically transverse mixing chamber before redistribution thereof over the surface of the catalyst bed to be contacted. Thus the arrangement of apparatus and method of utilizing is such as to obtain the uniformity of temperature desired as hereinbefore discussed, the quenching of the vaporous portion to a suitable extent and in a uniform manner and thereafter effecting a further uniform redistribution of the temperature adjusted vaporous and liquid phase materials.

Having thus provided a general description of the method and system of the present invention and specifically described one arrangement of apparatus for accomplishing the same, it is submitted that no undue restrictions are to be imposed by reasons thereof except as provided in the attached claims.

What we claim is:

1. In a process for effecting the conversion of hydrocarbons under hydrogenolysis conditions wherein temperature gradients encountered in a lateral and longitudinal direction through the hydrogenolysis zone are preferably controlled within relatively narrow defined temperature limits, the improvement for controlling said temperature gradients which comprises collecting and turbulently mixing under centrifugal conditions, the collected liquid and vaporous material discharged from a bed of hydrogenolysis catalyst, passing liquid and vaporous material thus mixed to provide a uniformity of temperature downwardly through a restricted passageway into an adjacent and radially extending liquid-vapor mixing and liquid distributing zone, passing distributed liquid material into a lower liquid-vapor collecting and distributing zone through a plurality of confined passageways, quenching vaporous material moved through said confined passageway to said radially extending mixing zone and causing quenched vaporous material of relatively uniform temperature to be admixed with liquid material and distributed onto the upper surface of a next succeeding catalyst bed in the hydrogenolysis zone.

2. A method for controlling lateral and longitudinal temperature gradients encountered in a multiple catalyst bed hydrogenolysis reactor which comprises collecting on a first tray vaporous and liquid material discharged from a bed of catalyst, turbulently agitating the collected liquid material and passing the same with said vaporous material into an annular mixing chamber below said first tray by at least one sloping confined passageway contributing centrifugal action to said mixed vapor-liquid materials and discharging the materials substantially tangentially into said annular mixing chamber, causing centrifugally mixed vapor-liquid materials to pass from the annular mixing chamber through a centrally located passageway discharging onto a lower liquid collecting-distribution pan of larger diameter than said annular mixing chamber to form a first liquid distributing chamber, causing the mixed liquid phase to be distributed over and discharged from said lower pan through liquid level maintaining downcomers relatively uniformly therefrom into a lower vapor-liquid collecting and distributing chamber, quenching liquid-vaporous material discharged onto said lower pan and causing quenched vaporous-liquid material of relatively uniform temperature to be distributed as a mixture over a bed of catalyst therebelow through a plurality of liquid level maintaining downcomers so as to contribute to further cooling of liquid material passed therethrough upon readmixture with vaporous material.

3. A method for controlling exothermic temperature gradients encountered in a multiple catalyst bed reaction zone which comprises collecting and temperature adjusting hot liquid and vaporous material in a centrifugal mixing zone, passing the material thus temperature adjusted to a first liquid collecting and distributing zone and further distributing the collected liquid material after contact with cooler quench gaseous material relatively uniformly over a second lower liquid retaining-vapor collecting zone, quenching collected vaporous material with cold quench gas after said turbulent mixing and passing the quenched vaporous material to said lower vapor collecting zone, effecting a further cooling of temperature adjusted liquid material by discharge of redistributed liquid from said second liquid-vapor collecting zone as a plurality of separate confined streams in admixture with the cooler vaporous material over the upper surface of a catalyst bed therebelow.

4. A method for controlling lateral and vertical temperature gradient conditions encountered in a multiple catalyst bed hydrocracking reactor which comprises collecting vapor-liquid material discharged from the bottom surface of a bed of catalyst, turbulently agitating the collected vaporous and liquid material in an enlarged first mixing zone, further mixing under centrifugal conditions in a smaller but lower mixing zone vapor-liquid material discharged from said first mixing zone, passing vaporous quench material comprising cooler hydrogen-rich quench gas in contact with vapor-liquid material discharged from said centrifugal mixing to obtain a further temperature lowering of the vaporous liquid material, distributing cooler liquid material from a first liquid collecting distributing zone into a second liquid collecting zone to obtain a further temperature adjustment thereof and effecting further cooling of the liquid material upon discharge from said second liquid collecting zone by admixture with lower temperature vaporous material during redistribution of the liquid material through a plurality of confined elongated passageways communicating with the upper surface of the next succeeding catalyst bed.

5. An arrangement of apparatus for adjusting the temperature of vaporous and liquid reactant phases caused to pass from one bed of catalyst to another bed of catalyst, which apparatus comprises a first liquid phase collecting pan positioned beneath a perforated grid supporting a bed of catalyst, said first collecting pan provided with two or more restricted open end passageways communicating with an annular chamber coaxially positioned beneath said first collecting pan, means for passing collected liquid and vaporous material downwardly through said passageways under conditions producing centrifugal motion thereto in said annular chamber, said annular chamber in open communication with a coaxially positioned downwardly extending passageway formed by said annular chamber, said downwardly extending passageway discharging onto a second liquid collecting pan of larger cross sectional diameter than said annular chamber but of smaller diameter than said first collecting pan so as to provide an annular space for flow of vaporous material about said second liquid collecting pan, means for spraying quench gasiform material into vapor and liquid material passed through said downwardly extending passageway, said second collecting pan being fashioned to collect and retain a depth of liquid on said pan, said second liquid collecting pan provided with a plurality of liquid level retaining elongated downcomers for passing temperature adjusted surface liquid material into a lower liquid collecting and distributing chamber hereinafter described, said lower distributing chamber receiving temperature adjusted vapor and liquid material from said upper chambers and provided with a plurality of liquid level retaining elongated downcomers for passing temperature adjusted liquid material in admixture with cooler vaporous material onto the upper cross sectional surface of a lower catalyst bed.

6. An apparatus arrangement for housing a plurality of separate catalyst beds and provided with means between beds for adjusting the temperature of vaporous and liquid material passed from one catalyst bed to another which means comprises:

a first enlarged chamber, the upper and lower surfaces of which are perforated and respectively in open communication with the bottom surface of an upper catalyst bed and the upper surface of a lower bed of catalyst, said enlarged chamber being vertically divided into a first liquid collecting chamber, an annular liquid-vapor mixing chamber of smaller diameter coaxially attached to the bottom side of said first collecting chamber, sloping open end passageways communicating between the first liquid collecting pan and said annular chamber, a second liquid collecting distributing pan of larger diameter than said annular chamber coaxially positioned beneath but spaced apart therefrom to form an annular space about said second liquid collecting pan.

means for distributing a quench fluid into liquid and vaporous material passed from said annular chamber onto said second liquid collecting pan, a plurality of elongated open end passageways extending above and below the surface of said second liquid collecting pan to provide means for passing collected liquid as a plurality of separate confined streams from said second liquid collecting pan into the bottom portion of said first enlarged chamber, the perforated lower surface of said enlarged chamber comprising a plurality of elongated liquid-retaining distributing downcomers for passing cooled liquid in admixture with cooled vaporous material at a desired temperature relatively uniformly over the upper surface of the underlying bed of catalyst.

References Cited

UNITED STATES PATENTS 3,353,924   11/1967   Riopelk _____ 208—108

DELBERT E. GANTZ, Primary Examiner

A. RIMENS, Assistant Examiner

U.S. Cl. X.R.

23—288